(12) United States Patent
Tsai

(10) Patent No.: US 8,499,413 B1
(45) Date of Patent: Aug. 6, 2013

(54) CASTOR BRAKING AND STOPPING ROTATING SIMULTANEOUSLY

(76) Inventor: Po-Chuan Tsai, Tainan Hsien (TW)

( * ) Notice: Subject to any disclaimer, the term of this patent is extended or adjusted under 35 U.S.C. 154(b) by 0 days.

(21) Appl. No.: 13/490,556

(22) Filed: Jun. 7, 2012

(51) Int. Cl.
*B60B 33/00* (2006.01)

(52) U.S. Cl.
USPC .......................................... 16/35 R; 188/1.12

(58) Field of Classification Search
USPC ..... 16/35 R, 35 D, 18 R, 37, 38, 47; 301/6.1; 188/1.12, 69
See application file for complete search history.

(56) References Cited

U.S. PATENT DOCUMENTS

| | | | | |
|---|---|---|---|---|
| 4,677,706 A * | 7/1987 | Screen | | 16/35 R |
| 5,014,391 A * | 5/1991 | Schulte | | 16/35 R |
| 5,133,106 A * | 7/1992 | Milbredt et al. | | 16/35 R |
| 5,303,450 A * | 4/1994 | Lange | | 16/35 D |
| 5,774,936 A * | 7/1998 | Vetter | | 16/35 R |
| 6,360,851 B1 * | 3/2002 | Yang | | 188/1.12 |
| 6,584,641 B1 * | 7/2003 | Milbredt | | 16/35 R |
| 7,516,512 B2 * | 4/2009 | Tsai | | 16/35 R |
| 7,930,802 B2 * | 4/2011 | Tsai | | 16/35 R |
| 8,051,533 B2 * | 11/2011 | Block et al. | | 16/35 R |
| 8,365,354 B1 * | 2/2013 | Fan | | 16/35 R |
| 2007/0289098 A1 * | 12/2007 | Tsai | | 16/35 R |
| 2010/0000050 A1 * | 1/2010 | Tsai | | 16/35 D |

* cited by examiner

*Primary Examiner* — William L. Miller
(74) *Attorney, Agent, or Firm* — Alan Kamrath; Kamrath IP Lawfirm, P.A.

(57) ABSTRACT

A castor includes a castor body, an operation unit, a locking unit, and two rollers. The operation unit includes a pressing plate and a rotation member. The locking unit includes a locking module, a stop ring, a locating member, and an upper positioning plate. The locking module has a locking member and a braking member. When the driving portion of the rotation member presses the first ramp of the pressing plate, the locating member is locked in the locking hole of the upper positioning plate. When the driving portion presses the second ramp of the pressing plate, the first engaging portion of the locking member engages the first locking portion of the stop ring, while the second engaging portion of the braking member engages the second locking portion of each of the rollers.

5 Claims, 8 Drawing Sheets

US 8,499,413 B1

CASTOR BRAKING AND STOPPING ROTATING SIMULTANEOUSLY

BACKGROUND OF THE INVENTION

1. Field of the Invention

The present invention relates to a wheeled vehicle and, more particularly, to a castor for a cart, chair and the like.

2. Description of the Related Art

A conventional castor in accordance with the prior art shown in FIGS. 1 and 2 comprises a fixed tube 11, a castor body 12 swivelably mounted on the fixed tube 11 and having an interior provided with a retaining hole 121, a first engaging member 122 mounted on the castor body 12, a control rod 113 movably mounted in the fixed tube 11 and extended through the castor body 12, a bushing 114 mounted between the fixed tube 11, the castor body 12 and the control rod 113, a second engaging member 1141 mounted on a mediate of the control rod 113, a roll 1131 mounted on a top of the control rod 113, a retaining block 116 mounted on a lower end of the control rod 113, a push block 1132 mounted on a bottom of the control rod 113, a cam 112 rotatably mounted in the fixed tube 11 and having a periphery provided with a first ear 1121 and a second ear 1122 which are movable to press the roll 1131, an operation handle 111 extended through the cam 112 to rotate the cam 112, two rollers 13 rotatably mounted on two opposite sides of the castor body 12 and each having a side provided with a plurality of locking grooves 131, an elastic unit 115 mounted between the control rod 113, the bushing 114, the second engaging member 1141 and the retaining block 116 to provide a restoring effect to the control rod 113, and a braking unit 117 mounted on the castor body 12. The braking unit 117 includes a slide 1172 movably mounted on the castor body 12 and a braking rod 1171 connected with the slide 1172. The slide 1172 has a side provided with a ramp 1173 aligning with the push block 1132.

In operation, when the cam 112 is rotated by the operation handle 111 in a first direction, the first ear 1121 of the cam 112 is movable to press the roll 1131 as shown in FIG. 2. In such a manner, the roll 1131 is moved downward to press and move the control rod 113 which moves the retaining block 116 so that the retaining block 116 is extended into and locked in the retaining hole 121 of the castor body 12 to lock the castor body 12. Thus, the castor body 12 is locked by the control rod 113 and cannot be rotated relative to the fixed tube 11, while each of the rollers 13 can be rotated relative to the castor body 12 freely, so that the castor is moved linearly and cannot be turned around.

Alternatively, when the cam 112 is rotated by the operation handle 111 in a second direction, the second ear 1122 of the cam 112 is movable to press the roll 1131. In such a manner, the roll 1131 is further moved downward to press and move the control rod 113 which moves the second engaging member 1141 so that the second engaging member 1141 is moved to engage the first engaging member 122 to lock the castor body 12. Thus, the castor body 12 is locked by the control rod 113 and cannot be rotated relative to the fixed tube 11. At the same time, when the control rod 113 is moved downward, the push block 1132 is moved by the control rod 113 to abut the ramp 1173 of the slide 1172, so that the slide 1172 is pushed to move the braking rod 1171. In such a manner, the braking rod 1171 is extended into and locked in one of the locking grooves 131 of each of the rollers 13 so as to lock each of the rollers 13. In such a manner, each of the two rollers 13 is locked by the braking rod 1171 and cannot be rotated relative to the castor body 12. Thus, the castor is braked to stop moving and cannot be turned around.

BRIEF SUMMARY OF THE INVENTION

The primary objective of the present invention is to provide a castor that is controlled by an operation handle to brake and stop rotating simultaneously so as to provide a double-braking function.

According to the primary advantage of the present invention, when the castor is locked completely, each of the rollers is locked by the locking module and cannot be rotated relative to the castor body, and the castor body is locked by the stop ring and cannot be rotated relative to the support tube, so that the castor will be braked and stop rotating simultaneously so as to provide a double-braking effect.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
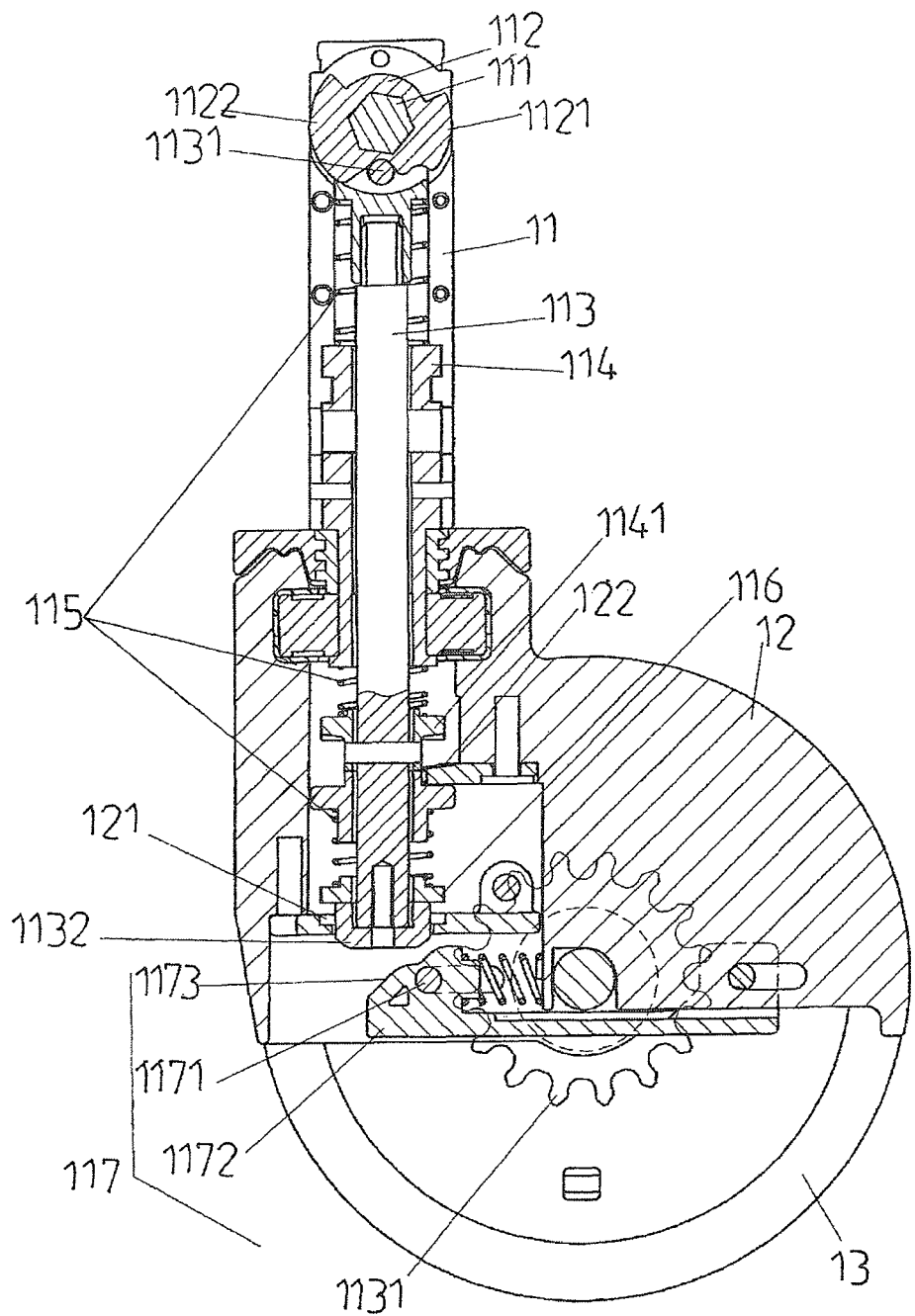
FIG. 1 is a side cross-sectional view of a conventional castor in accordance with the prior art.
Figure 2:
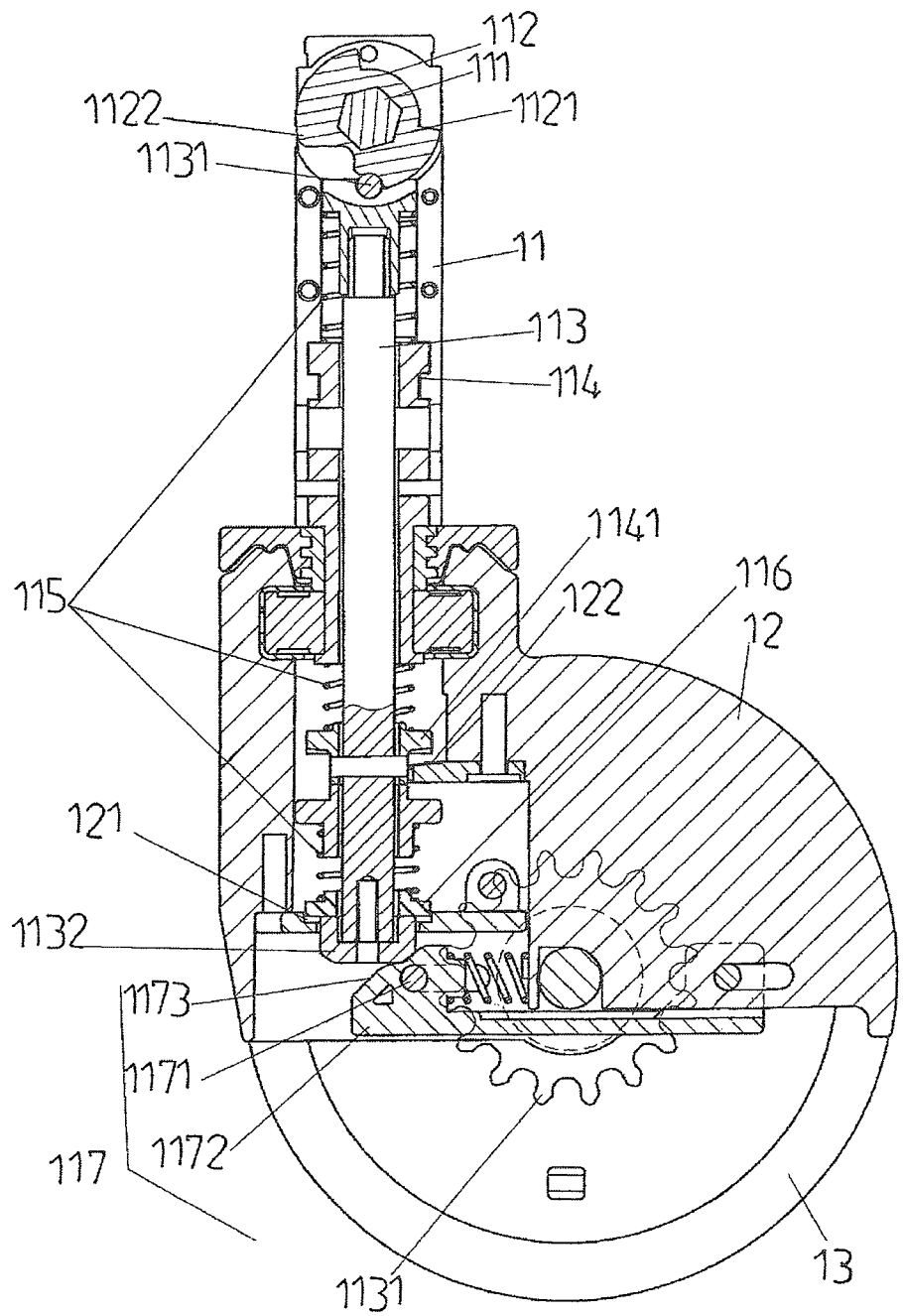
FIG. 2 is a schematic operational view of the conventional castor as shown in FIG. 1.
Figure 3:
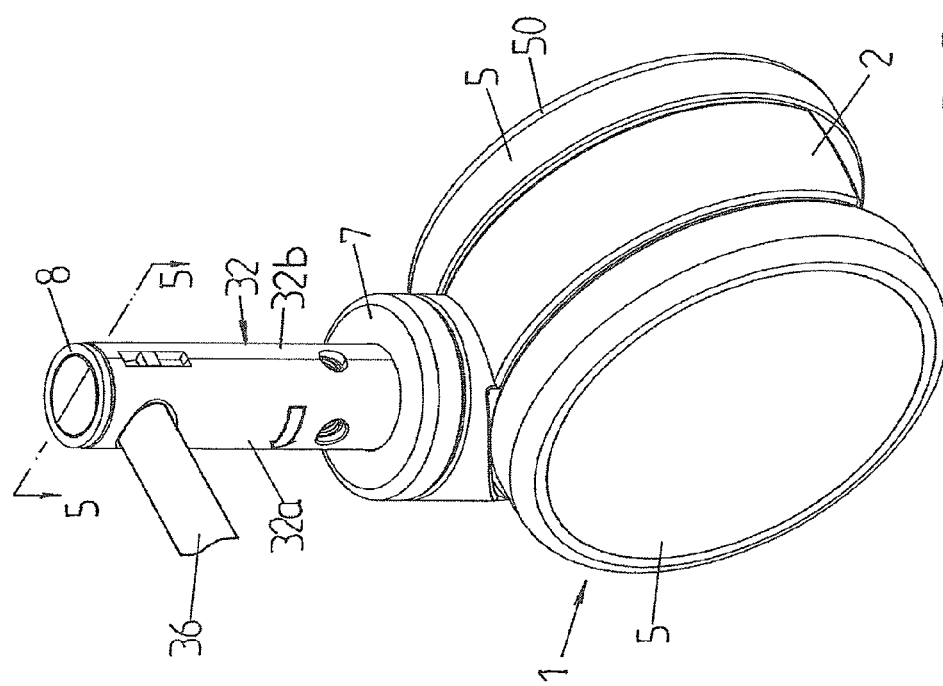
FIG. 3 is a perspective view of a castor in accordance with the preferred embodiment of the present invention.
Figure 4:
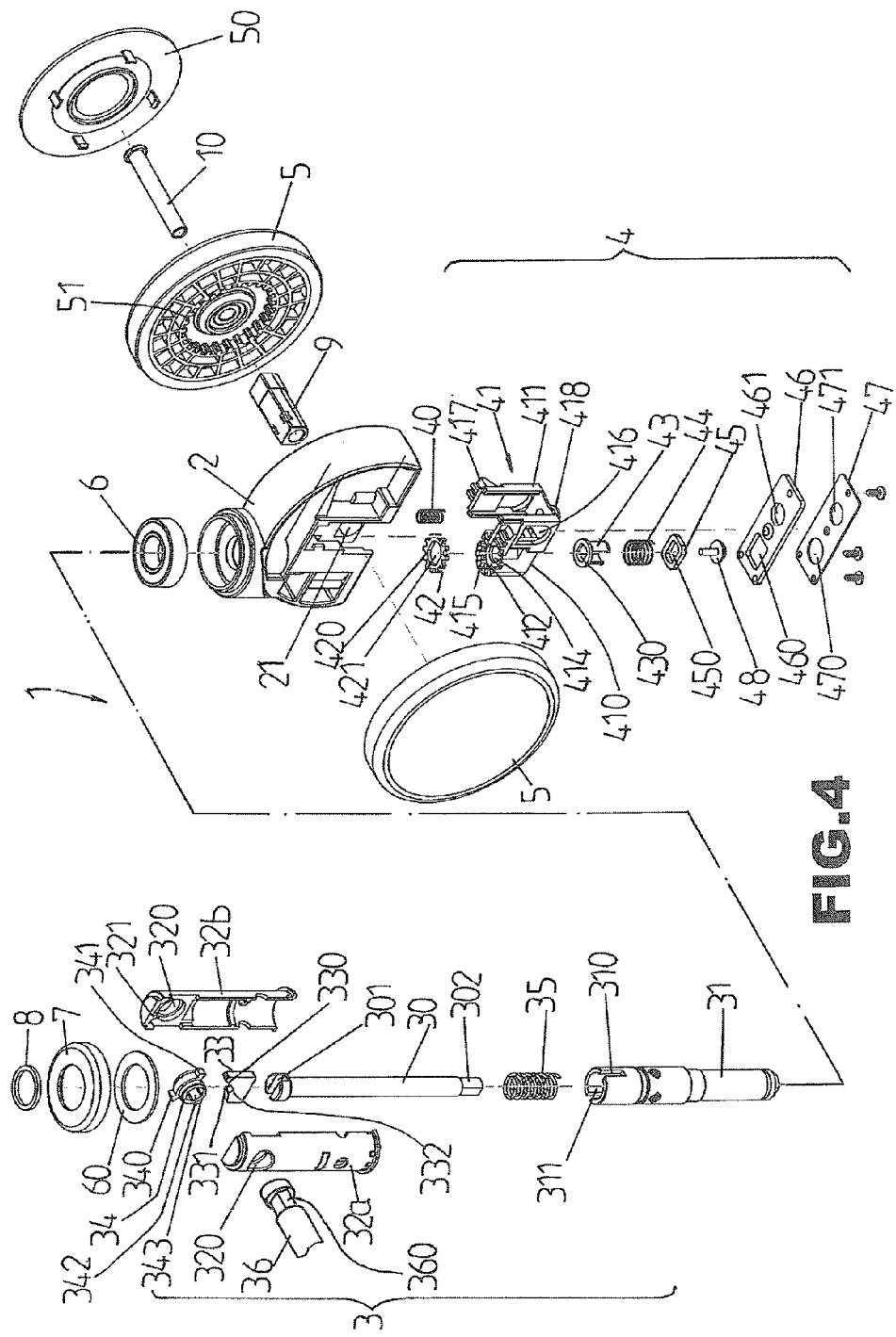
FIG. 4 is an exploded perspective view of the castor as shown in FIG. 3.
Figure 5:
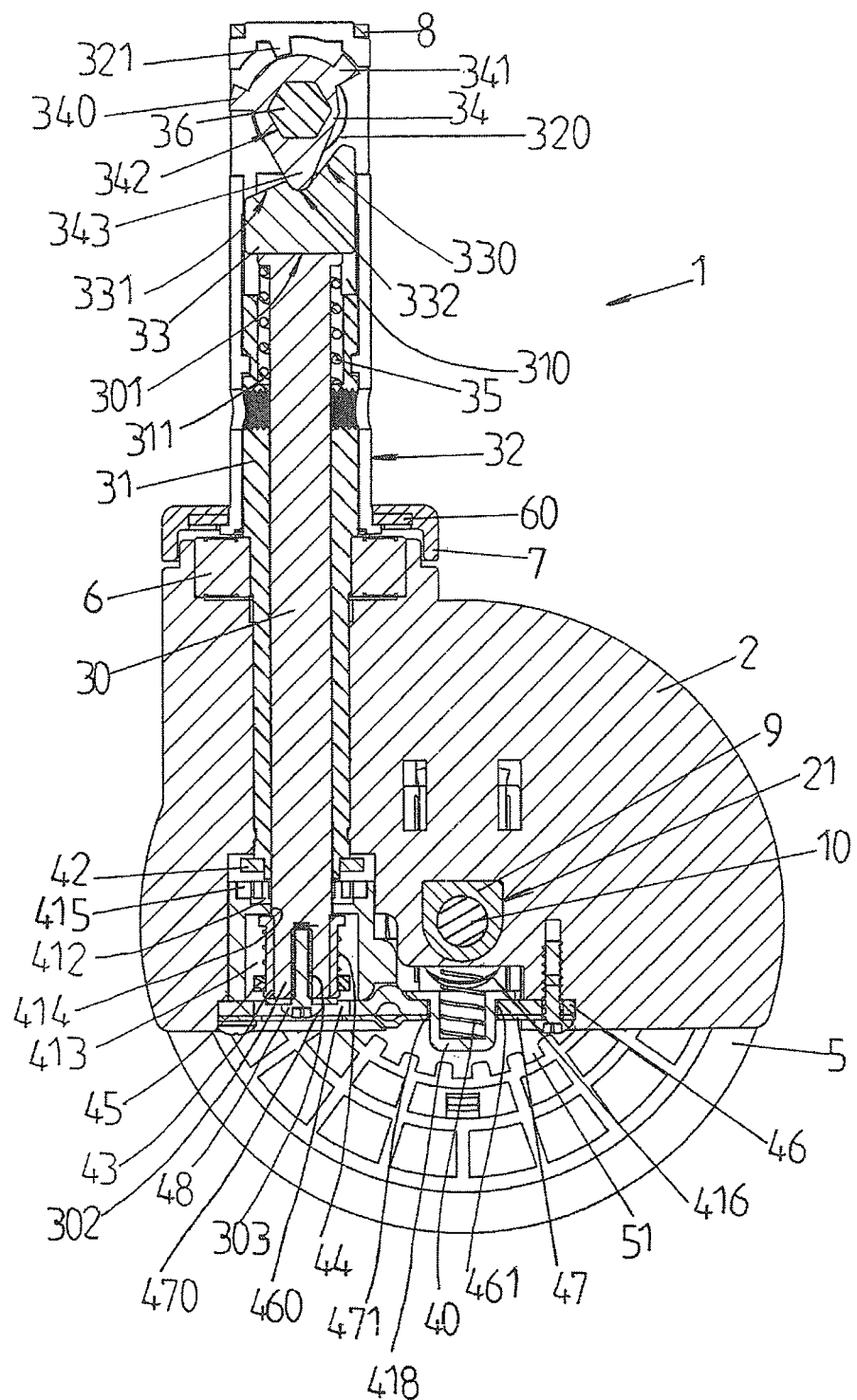
FIG. 5 is a side cross-sectional view of the castor taken along line 5-5 as shown in FIG. 3.

Referring to the drawings and initially to FIGS. 3-5, a castor 1 in accordance with the preferred embodiment of the present invention comprises a castor body 2, an operation unit 3, a locking unit 4, two rollers 5, a mandrel 10, and a bushing 9.

The operation unit 3 includes a support tube 31, a control rod 30, a housing 32, a pressing plate 33, a rotation member 34, a first elastic member 35, and an operation handle 36.

The support tube 31 of the operation unit 3 has a top provided with at least one slideway 310. The support tube 31 of the operation unit 3 has an inner wall provided with a stepped mounting chamber 311 to receive the first elastic member 35.

The control rod 30 of the operation unit 3 is movably mounted in the support tube 31. The control rod 30 of the operation unit 3 has a top provided with a receiving groove 301. The control rod 30 of the operation unit 3 has a bottom provided with a non-circular fixing portion 302. The fixing portion 302 of the control rod 30 has an interior provided with a screw bore 303.

The housing 32 of the operation unit 3 is mounted on the support tube 31. The housing 32 of the operation unit 3 consists of two shells 32a and 32b which are combined together and encircle the control rod 30 and the support tube 31. The housing 32 of the operation unit 3 has an inner face provided with at least one limit flange 321 and has a peripheral wall provided with at least one through hole 320. The shells 32a and 32b of the housing 32 are combined together by a retaining ring 8 and a mounting ring 60. The mounting ring 60 is covered by a top cover 7 which also covers a top of the castor body 2.

The pressing plate 33 of the operation unit 3 is partially received in the receiving groove 301 of the control rod 30 and is movable in the slideway 310 of the support tube 31. The pressing plate 33 of the operation unit 3 has a top provided with a first ramp 330, a second ramp 331 and an arcuate dimple 332. The first ramp 330 of the pressing plate 33 has a height greater than that of the second ramp 331. The arcuate dimple 332 of the pressing plate 33 is located between the first ramp 330 and the second ramp 331.

The rotation member 34 of the operation unit 3 is rotatably mounted in the housing 32 and is disposed above the pressing plate 33. The rotation member 34 of the operation unit 3 has an interior provided with a fixing hole 342 and has a periphery provided with a first limit ear 340, a second limit ear 341 and a driving portion 343. The fixing hole 342 of the rotation member 34 is aligned with the through hole 320 of the housing 32. The fixing hole 342 of the rotation member 34 has a non-circular shape and is fixed on the operation handle 36 so that the rotation member 34 is rotatable in concert with the operation handle 36. The driving portion 343 of the rotation member 34 is received in the arcuate dimple 332 of the pressing plate 33 and is movable to press the first ramp 330 and the second ramp 331 of the pressing plate 33. Each of the first limit ear 340 and the second limit ear 341 of the rotation member 34 is movable to abut the limit flange 321 of the housing 32, with the limit flange 321 of the housing 32 being disposed between the first limit ear 340 and the second limit ear 341 of the rotation member 34.

The first elastic member 35 of the operation unit 3 is received in the support tube 31 and is biased between the support tube 31 and the control rod 30.

The operation handle 36 of the operation unit 3 is extended through the through hole 320 of the housing 32 and the fixing hole 342 of the rotation member 34. The operation handle 36 of the operation unit 3 has a non-circular drive portion 360 secured in the fixing hole 342 of the rotation member 34.

The castor body 2 is swivelably mounted on the support tube 31 of the operation unit 3 by a bearing 6 which is disposed between the castor body 2 and the support tube 31 of the operation unit 3. The castor body 2 has a mediate portion provided with a mounting hole 21 to allow passage of the bushing 9. The bushing 9 is mounted in the mounting hole 21 of the castor body 2 and encircles the mandrel 10.

The two rollers 5 are rotatably mounted on two opposite sides of the castor body 2 by the mandrel 10 which is extended through the bushing 9. Each of the two rollers 5 is mounted on the mandrel 10 and has a side provided with a toothed second locking portion 51. The second locking portion 51 of each of the rollers 5 is arranged to have an annular shape. An end cap 50 is mounted on one of the rollers 5.

The locking unit 4 includes a second elastic member 40, a locking module 41, a stop ring 42, a mounting sleeve 43, a third elastic member 44, a locating member 45, an upper positioning plate 46, a lower positioning plate 47, and a screw/washer assembly 48.

The stop ring 42 of the locking unit 4 is secured on the support tube 31 of the operation unit 3 and is disposed in the castor body 2. The stop ring 42 of the locking unit 4 has an outer wall provided with a toothed first locking portion 420. The stop ring 42 has an inner wall provided with a non-circular fixing bore 421 secured on a lower end of the support tube 31 to affix the stop ring 42 to the support tube 31. The first locking portion 420 of the stop ring 42 is arranged to have an annular shape.

The upper positioning plate 46 of the locking unit 4 is secured on a bottom of the castor body 2. The upper positioning plate 46 of the locking unit 4 has a first end provided with a locking hole 460 and a second end provided with a first passage 461. The locking hole 460 of the upper positioning plate 46 has a non-circular shape. The first passage 461 of the upper positioning plate 46 has a circular shape.

The lower positioning plate 47 of the locking unit 4 is secured on a bottom of the upper positioning plate 46. The lower positioning plate 47 of the locking unit 4 has a first end provided with an exposing hole 470 aligning with the locking hole 460 of the upper positioning plate 46 and a second end provided with a second passage 471 aligning with the first passage 461 of the upper positioning plate 46. The exposing hole 470 of the lower positioning plate 47 has a circular shape. The second passage 471 of the lower positioning plate 47 has a circular shape.

The locking module 41 of the locking unit 4 is movably mounted on the castor body 2 and is movable in concert with the control rod 30 of the operation unit 3. The locking module 41 of the locking unit 4 has a first end provided with a locking member 410 and a second end provided with a braking member 411. The locking member 410 and the braking member 411 of the locking module 41 are formed integrally.

The locking member 410 of the locking module 41 has a cylindrical shape. The locking member 410 of the locking module 41 has a top face provided with a toothed first engaging portion 415 that is movable to engage the first locking portion 420 of the stop ring 42 so as to lock the locking member 410 of the locking module 41 onto the stop ring 42. The first engaging portion 415 of the locking member 410 is arranged to have an annular shape. The locking member 410 of the locking module 41 has an upper end provided with an upper recess 412 and a lower end provided with a lower recess 413. The lower recess 413 of the locking member 410 has a size smaller than that of the upper recess 412. The locking member 410 of the locking module 41 has a mediate portion provided with a passageway 414 to allow passage of the control rod 30 which is extended through the locking member 410 of the locking module 41. The passageway 414 of the locking member 410 is connected between the upper recess 412 and the lower recess 413.

The braking member 411 of the locking module 41 has a U-shaped profile. The braking member 411 of the locking module 41 has two opposite sides each having a top provided with a toothed second engaging portion 417 that is movable to engage the second locking portion 51 of a respective one of the rollers 5 so as to lock each of the rollers 5 onto the braking member 411 of the locking module 41. The second engaging portion 417 of the braking member 411 is preferably a horizontal toothed rack. Each of the two opposite sides of the braking member 411 has a surface provided with an elongate guiding slot 416 that is slidable on the bushing 9. The braking member 411 of the locking module 41 has a bottom wall provided with a recessed protrusion 418. The protrusion 418 of the braking member 411 is movable to extend into the first passage 461 of the upper positioning plate 46 and the second passage 471 of the lower positioning plate 47.

The second elastic member 40 of the locking unit 4 is received in the protrusion 418 of the braking member 411 and is biased between the braking member 411 of the locking module 41 and the castor body 2.

The mounting sleeve 43 of the locking unit 4 is mounted on the control rod 30 to move in concert with the control rod 30 and has a top abutting the locking member 410 of the locking module 41. The mounting sleeve 43 of the locking unit 4 has a substantially T-shaped profile and has an interior provided with a non-circular through bore 430 to allow passage of the control rod 30 which is extended through the mounting sleeve 43.

The locating member 45 of the locking unit 4 is mounted on the mounting sleeve 43 to move in concert with the mounting sleeve 43 and aligns with the locking hole 460 of the upper positioning plate 46. The locating member 45 of the locking unit 4 is movable to extend into the locking hole 460 of the upper positioning plate 46 so that the locating member 45 of the locking unit 4 is locked by the upper positioning plate 46. The locating member 45 of the locking unit 4 has a non-circular shape matching that of the locking hole 460 of the upper positioning plate 46. The locating member 45 of the locking unit 4 has an interior provided with a non-circular fixing aperture 450 secured on the mounting sleeve 43.

The third elastic member 44 of the locking unit 4 is mounted on the mounting sleeve 43 and is biased between the mounting sleeve 43 and the locating member 45.

The screw/washer assembly 48 of the locking unit 4 is screwed into the screw bore 303 of the fixing portion 302 of the control rod 30 and abuts a bottom of the mounting sleeve 43 to limit the mounting sleeve 43 on the control rod 30.

Figure 6:
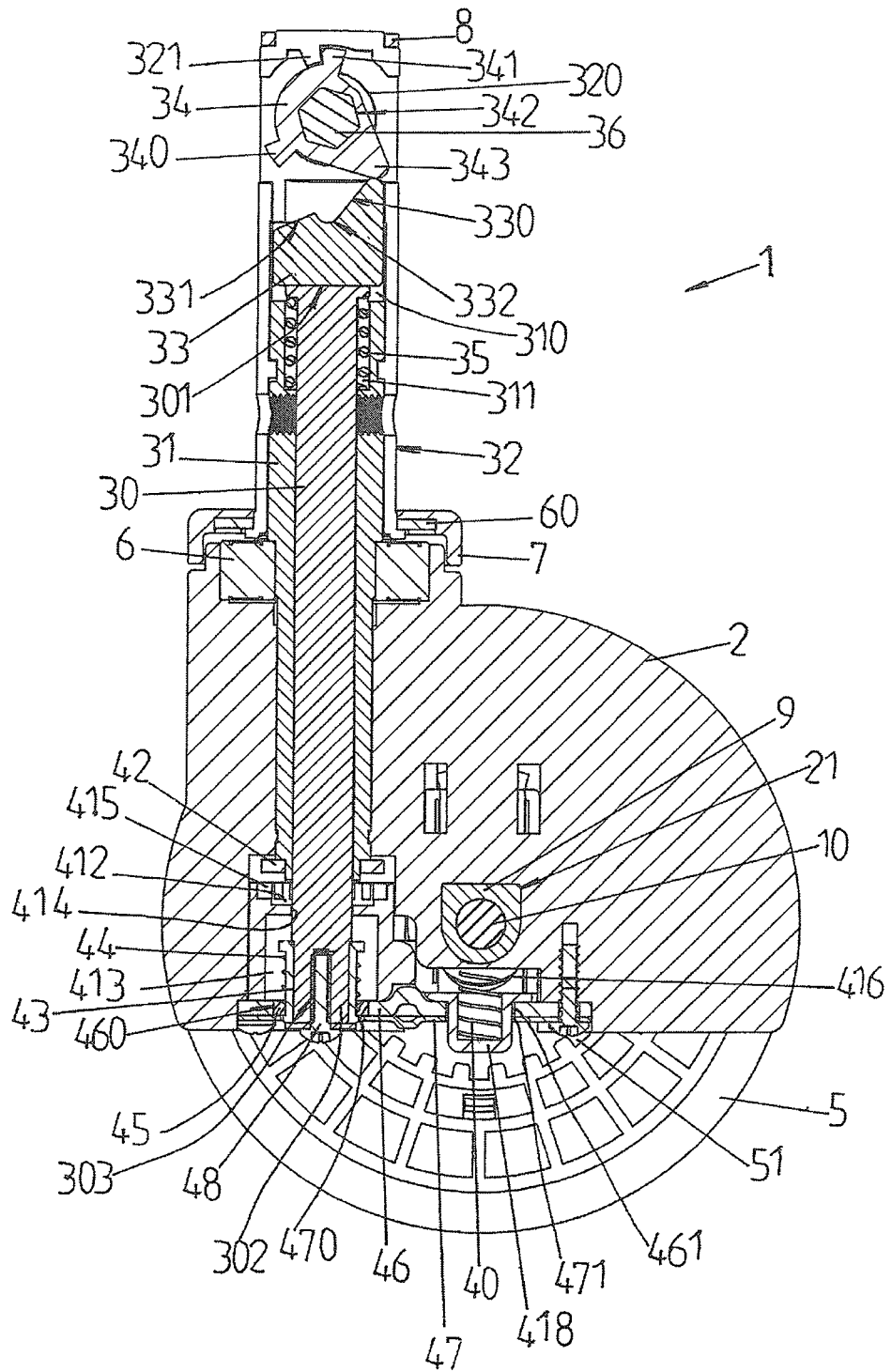
FIG. 6 is a schematic operational view of the castor as shown in FIG. 5.
Figure 7:
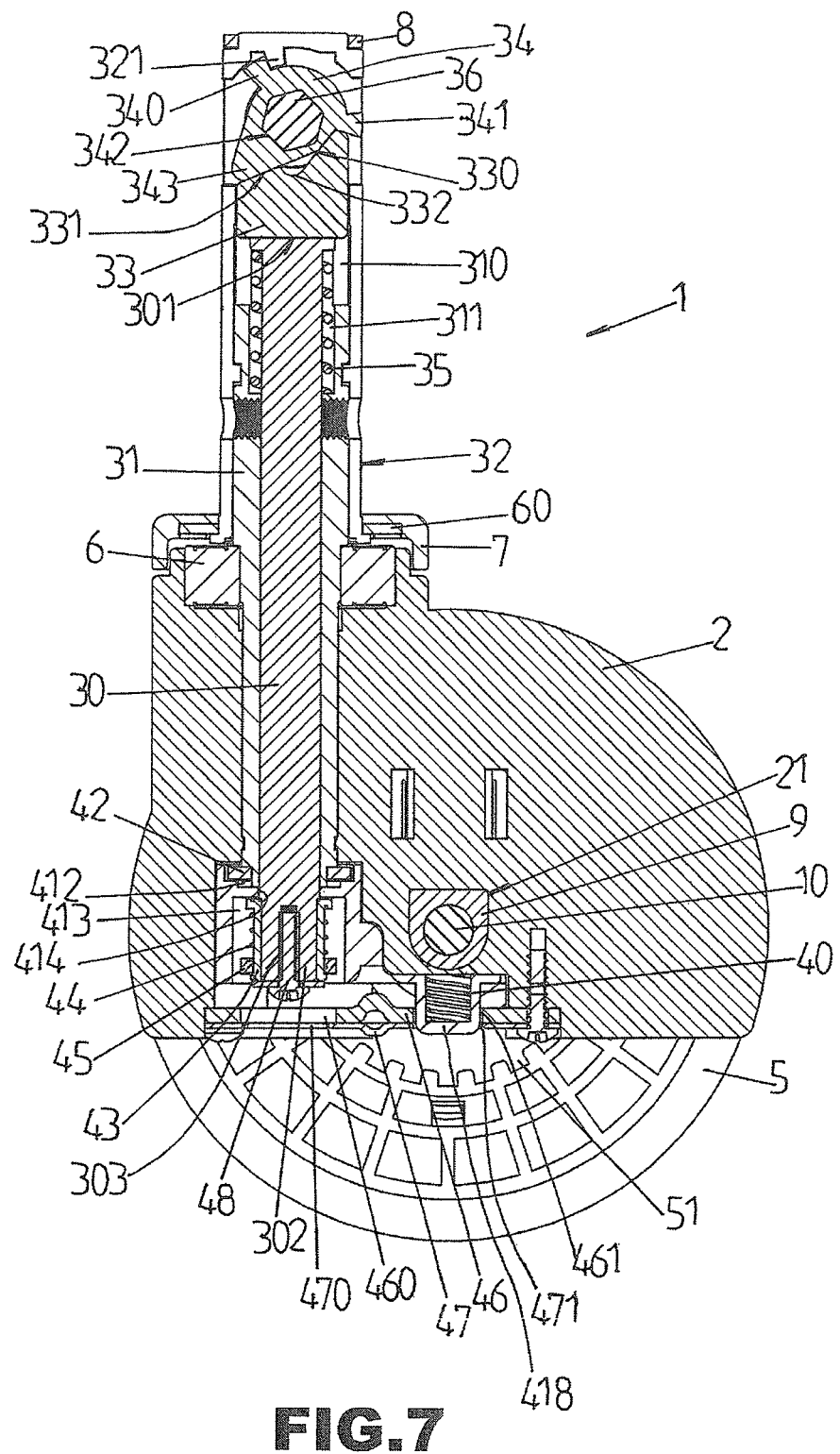
FIG. 7 is a schematic operational view of the castor as shown in FIG. 5.
Figure 8:
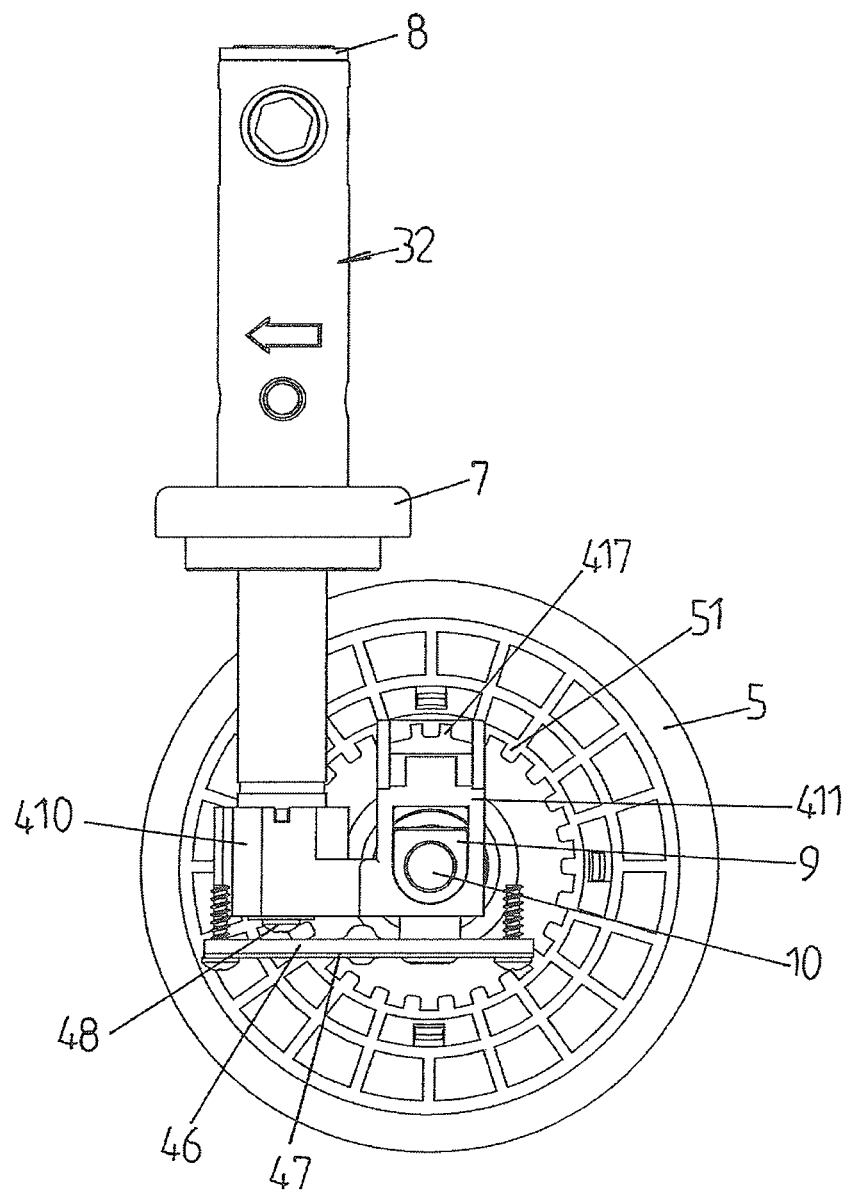
FIG. 8 is a partially cut-away side operational view of the castor as shown in FIG. 3.

In operation, referring to FIGS. 6-8 with reference to FIGS. 3-5, when the rotation member 34 is rotated by the operation handle 36 in a first direction, the driving portion 343 of the rotation member 34 is detached from the arcuate dimple 332 of the pressing plate 33 and is movable to press the first ramp 330 of the pressing plate 33 as shown in FIG. 6. In such a manner, the pressing plate 33 is moved downward to press and move the control rod 30 which presses and moves the locating member 45 so that the locating member 45 is extended into and locked in the locking hole 460 of the upper positioning plate 46 to lock the castor body 2. Thus, the castor body 2 is locked by the control rod 30 and cannot be rotated relative to the support tube 31, while each of the two rollers 5 can be rotated relative to the castor body 2 freely, so that the castor 1 is moved linearly and cannot be turned around. At this time, the second limit ear 341 of the rotation member 34 is movable to abut the limit flange 321 of the housing 32 to limit a further rotation of the rotation member 34.

Alternatively, when the rotation member 34 is rotated by the operation handle 36 in a second direction, the driving portion 343 of the rotation member 34 is detached from the arcuate dimple 332 of the pressing plate 33 and is movable to press the second ramp 331 of the pressing plate 33 as shown in FIG. 7 to release the pressing plate 33 and the control rod 30 so that the control rod 30 is pushed upward by the restoring force of the first elastic member 35. In such a manner, the mounting sleeve 43 and the locating member 45 are moved upward by the control rod 30, and the locking member 410 of the locking module 41 is pushed upward by the mounting sleeve 43 so that the locking module 41 is moved upward. Thus, the first engaging portion 415 of the locking member 410 is moved upward to engage the first locking portion 420 of the stop ring 42 as shown in FIG. 7 so as to lock the locking member 410 of the locking module 41 onto the stop ring 42, while the second engaging portion 417 of the braking member 411 is also moved upward to engage the second locking portion 51 of each of the rollers 5 as shown in FIG. 8 so as to lock each of the rollers 5 onto the braking member 411 of the locking module 41. In such a manner, each of the two rollers 5 is locked onto and cannot be rotated relative to the castor body 2, while the locking member 410 of the locking module 41 is locked by the stop ring 42 so that the castor body 2 is locked onto and cannot be rotated relative to the support tube 31. Thus, the castor 1 stops moving and cannot be turned around. At this time, the first limit ear 340 of the rotation member 34 is movable to abut the limit flange 321 of the housing 32 to limit a further rotation of the rotation member 34. In addition, when the first engaging portion 415 of the locking member 410 is moved upward to engage the first locking portion 420 of the stop ring 42, the third elastic member 44 provides an elastic buffering effect between the locking module 41, the stop ring 42 and each of the two rollers 5, so that the first engaging portion 415 of the locking member 410 engages the first locking portion 420 of the stop ring 42 smoothly and stably, and the second engaging portion 417 of the braking member 411 engages the second locking portion 51 of each of the rollers 5 smoothly and stably.

On the contrary, when the driving portion 343 of the rotation member 34 is detached from the second ramp 331 of the pressing plate 33 and is movable to extend into the arcuate dimple 332 of the pressing plate 33 as shown in FIG. 5, the control rod 30 is pressed and moved downward slightly, and the mounting sleeve 43 is moved downward by the control rod 30 to release the locking member 410 of the locking module 41, so that the locking module 41 is released and is moved downward by the restoring force of the second elastic member 40. In such a manner, the first engaging portion 415 of the locking member 410 is moved downward to disengage the first locking portion 420 of the stop ring 42 so as to unlock the locking member 410 of the locking module 41 from the stop ring 42, while the second engaging portion 417 of the braking member 411 is also moved downward to disengage the second locking portion 51 of each of the rollers 5 so as to unlock each of the rollers 5 from the braking member 411 of the locking module 41. Thus, each of the rollers 5 is unlocked from the braking member 411 of the locking module 41 so that each of the two rollers 5 can be rotated relative to the castor body 2, while the locking member 410 of the locking module 41 is unlocked from the stop ring 42 so that the castor body 2 is unlocked from and can be rotated freely relative to the support tube 31.

It is appreciated that, the guiding slot 416 of the braking member 411 is slidable on the bushing 9 when the braking member 411 of the locking module 41 is moved relative to the castor body 2 to guide movement of the braking member 411. In such a manner, when the second engaging portion 417 of the braking member 411 is moved downward to disengage the second locking portion 51 of each of the rollers 5, the top of the guiding slot 416 abuts the bushing 9 as shown in FIG. 5, and when the second engaging portion 417 of the braking member 411 is moved upward to engage the second locking portion 51 of each of the rollers 5, the bottom of the guiding slot 416 abuts the bushing 9 as shown in FIG. 7.

Accordingly, when the castor 1 is locked completely, each of the rollers 5 is locked by the locking module 41 and cannot be rotated relative to the castor body 2, and the castor body 2 is locked by the stop ring 42 and cannot be rotated relative to the support tube 31, so that the castor 1 will be braked and stop rotating simultaneously so as to provide a double-braking effect. In addition, when the castor 1 is locked partially, the castor body 2 is locked by the control rod 30 and cannot be rotated relative to the support tube 31, while each of the rollers 5 can be rotated relative to the castor body 2 freely, so that the castor 1 is moved linearly and cannot be turned around.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A castor comprising:
a castor body, an operation unit, a locking unit, two rollers, a mandrel, and a bushing;
wherein:
the operation unit includes a support tube, a control rod, a housing, a pressing plate, a rotation member, a first elastic member, and an operation handle;
the support tube of the operation unit has a top provided with at least one slideway;
the control rod of the operation unit is movably mounted in the support tube;
the control rod of the operation unit has a top provided with a receiving groove;
the control rod of the operation unit has a bottom provided with a fixing portion;
the fixing portion of the control rod has an interior provided with a screw bore;
the housing of the operation unit is mounted on the support tube;
the housing of the operation unit includes two shells which encircle the control rod and the support tube;
the housing of the operation unit has an inner face provided with at least one limit flange and has a peripheral wall provided with at least one through hole;
the pressing plate of the operation unit is partially received in the receiving groove of the control rod and is movable in the slideway of the support tube;
the pressing plate of the operation unit has a top provided with a first ramp, a second ramp and an arcuate dimple;
the first ramp of the pressing plate has a height greater than that of the second ramp;
the arcuate dimple of the pressing plate is located between the first ramp and the second ramp;
the rotation member of the operation unit is rotatably mounted in the housing and is disposed above the pressing plate;
the rotation member of the operation unit has an interior provided with a fixing hole and has a periphery provided with a first limit ear, a second limit ear and a driving portion;
the fixing hole of the rotation member is fixed on the operation handle;
the rotation member is rotatable in concert with the operation handle;
the driving portion of the rotation member is received in the arcuate dimple of the pressing plate and is movable to press the first ramp and the second ramp of the pressing plate;
each of the first limit ear and the second limit ear of the rotation member is movable to abut the limit flange of the housing;
the first elastic member of the operation unit is received in the support tube and is biased between the support tube and the control rod;
the operation handle of the operation unit is extended through the through hole of the housing and the fixing hole of the rotation member;
the castor body is swivelably mounted on the support tube of the operation unit;
the castor body has a mediate portion provided with a mounting hole;
the bushing is mounted in the mounting hole of the castor body and encircles the mandrel;
the two rollers are rotatably mounted on two opposite sides of the castor body by the mandrel which is extended through the bushing;
each of the two rollers is mounted on the mandrel and has a side provided with a toothed second locking portion;
the locking unit includes a second elastic member, a locking module, a stop ring, a mounting sleeve, a third elastic member, a locating member, an upper positioning plate, a lower positioning plate, and a screw and washer assembly;
the stop ring of the locking unit is secured on the support tube of the operation unit;
the stop ring of the locking unit has an outer wall provided with a toothed first locking portion;
the upper positioning plate of the locking unit is secured on a bottom of the castor body;
the upper positioning plate of the locking unit has a first end provided with a locking hole and a second end provided with a first passage;
the lower positioning plate of the locking unit is secured on a bottom of the upper positioning plate;
the lower positioning plate of the locking unit has a first end provided with an exposing hole aligning with the locking hole of the upper positioning plate and a second end provided with a second passage aligning with the first passage of the upper positioning plate;
the locking module of the locking unit has a first end provided with a locking member and a second end provided with a braking member;
the locking member of the locking module has a top face provided with a toothed first engaging portion movable to engage the first locking portion of the stop ring;
the control rod is extended through the locking member of the locking module and the mounting sleeve;
the braking member of the locking module has two opposite sides each having a top provided with a toothed second engaging portion movable to engage the second locking portion of a respective one of the two rollers;
each of the two opposite sides of the braking member has a surface provided with an elongate guiding slot slidable on the bushing;
the braking member of the locking module has a bottom wall provided with a recessed protrusion;
the protrusion of the braking member is movable to extend into the first passage of the upper positioning plate and the second passage of the lower positioning plate;
the second elastic member of the locking unit is received in the protrusion of the braking member and is biased between the braking member of the locking module and the castor body;
the mounting sleeve of the locking unit is mounted on the control rod and has a top abutting the locking member of the locking module;
the locating member of the locking unit is mounted on the mounting sleeve;
the locating member of the locking unit is movable to extend into the locking hole of the upper positioning plate;
the locating member of the locking unit is locked by the upper positioning plate;
the third elastic member of the locking unit is mounted on the mounting sleeve and is biased between the mounting sleeve and the locating member; and
the screw and washer assembly of the locking unit is screwed into the screw bore of the fixing portion of the control rod and abuts a bottom of the mounting sleeve.

2. The castor of claim 1, wherein:
- when the driving portion of the rotation member is movable to press the first ramp of the pressing plate, the pressing plate is moved downward to press and move the control rod which presses and moves the locating member with the locating member extended into and locked in the locking hole of the upper positioning plate to lock the castor body; and
- when the driving portion of the rotation member is movable to press the first ramp of the pressing plate, the second limit ear of the rotation member is movable to abut the limit flange of the housing to limit a further rotation of the rotation member.

3. The castor of claim 1, wherein:
- when the driving portion of the rotation member is movable to press the second ramp of the pressing plate to release the pressing plate and the control rod, the control rod is pushed upward by the first elastic member, the mounting sleeve and the locating member are moved upward by the control rod, and the locking member of the locking module is pushed upward by the mounting sleeve with the first engaging portion of the locking member moved upward to engage the first locking portion of the stop ring to lock the locking member of the locking module onto the stop ring, while the second engaging portion of the braking member is moved upward to engage the second locking portion of each of the rollers to lock each of the rollers onto the braking member of the locking module; and
- when the driving portion of the rotation member is movable to press the second ramp of the pressing plate, the first limit ear of the rotation member is movable to abut the limit flange of the housing to limit a further rotation of the rotation member.

4. The castor of claim 1, wherein when the driving portion of the rotation member is movable to extend into the arcuate dimple of the pressing plate, the control rod is pressed and moved downward slightly, and the mounting sleeve is moved downward by the control rod to release the locking member of the locking module, with the locking module released and moved downward by the second elastic member, the first engaging portion of the locking member is moved downward to disengage the first locking portion of the stop ring to unlock the locking member of the locking module from the stop ring, and the second engaging portion of the braking member is moved downward to disengage the second locking portion of each of the rollers to unlock each of the rollers from the braking member of the locking module.

5. The castor of claim 1, wherein the guiding slot of the braking member is slidable on the bushing when the braking member of the locking module is moved relative to the castor body to guide movement of the braking member.

* * * * *